United States Patent
Palm et al.

(10) Patent No.: US 9,699,690 B2
(45) Date of Patent: Jul. 4, 2017

(54) NODE AND METHOD FOR CARRIER AGGREGATION COMPATIBILITY REPORTING OF A WIRELESS DEVICE

(71) Applicant: Telefonaktiebolaget L M Ericsson (publ), Stockholm (SE)

(72) Inventors: Håkan Palm, Växjö (SE); Christian Bergljung, Lund (SE); Lisa Boström, Solna (SE); Tao Cui, Upplands Väsby (SE); Elena Myhre, Järfälla (SE); Ingrid Nordstrand, Sundbyberg (SE); Erika Tejedor, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 58 days.

(21) Appl. No.: 14/428,850

(22) PCT Filed: Mar. 13, 2015

(86) PCT No.: PCT/SE2015/050282
§ 371 (c)(1),
(2) Date: Apr. 15, 2015

(87) PCT Pub. No.: WO2015/142248
PCT Pub. Date: Sep. 24, 2015

(65) Prior Publication Data
US 2016/0262053 A1   Sep. 8, 2016

Related U.S. Application Data

(60) Provisional application No. 61/968,245, filed on Mar. 20, 2014.

(51) Int. Cl.
*H04W 24/10* (2009.01)
*H04W 28/18* (2009.01)
(Continued)

(52) U.S. Cl.
CPC ............ *H04W 28/18* (2013.01); *H04L 5/001* (2013.01); *H04L 5/0092* (2013.01);
(Continued)

(58) Field of Classification Search
None
See application file for complete search history.

(56) References Cited

U.S. PATENT DOCUMENTS

2012/0044910 A1* 2/2012 Maeda .................. H04L 5/0005
370/332
2012/0178465 A1   7/2012 Lin et al.
(Continued)

FOREIGN PATENT DOCUMENTS

WO   2012099404 A2   7/2012
WO   2013024796 A1   2/2013

OTHER PUBLICATIONS

Nokia, "TP for CA UE TR: Carrier Aggregation Rules", TSG-RAN Working Group 4 (Radio), Ad Hoc Meeting #2, R4-101129, Dublin, Ireland, Apr. 12-16, 2010, 1-14.
(Continued)

*Primary Examiner* — Hassan Phillips
*Assistant Examiner* — Duc Duong
(74) *Attorney, Agent, or Firm* — Murphy, Bilak & Homiller, PLLC

(57) ABSTRACT

Example embodiments presented herein are directed towards a base station (401), and corresponding method therein, for obtaining a carrier aggregation compatibility report comprising a subset of a total number of frequency band and/or frequency band combinations supported by a wireless device. Example embodiments presented herein are also directed towards a wireless device (501), and corresponding method therein, for providing a carrier aggregation compatibility report comprising a subset of the total number (Continued)

of frequency bands and/or frequency band combinations supported by the wireless device.

40 Claims, 10 Drawing Sheets

(51) Int. Cl.
| | | |
|---|---|---|
| *H04W 72/04* | (2009.01) | |
| *H04L 5/00* | (2006.01) | |
| *H04W 36/00* | (2009.01) | |
| *H04W 48/16* | (2009.01) | |
| *H04W 28/06* | (2009.01) | |
| *H04W 72/02* | (2009.01) | |

(52) U.S. Cl.
CPC ....... *H04W 24/10* (2013.01); *H04W 36/0094* (2013.01); *H04W 48/16* (2013.01); *H04W 72/048* (2013.01); *H04L 5/0037* (2013.01); *H04W 28/06* (2013.01); *H04W 72/02* (2013.01)

(56) References Cited

U.S. PATENT DOCUMENTS

| | | | | |
|---|---|---|---|---|
| 2012/0184281 | A1* | 7/2012 | Kim | H04W 72/0453 455/450 |
| 2012/0287911 | A1* | 11/2012 | Takano | H04W 36/0088 370/332 |
| 2013/0051288 | A1* | 2/2013 | Yamada | H04W 8/24 370/280 |
| 2013/0142139 | A1 | 6/2013 | Kitazoe et al. | |
| 2014/0213268 | A1* | 7/2014 | Sagae | H04L 5/001 455/450 |
| 2015/0264637 | A1* | 9/2015 | Zaus | H04W 48/14 455/434 |
| 2016/0227365 | A1* | 8/2016 | Siomina | H04W 4/02 455/456.2 |
| 2016/0270139 | A1* | 9/2016 | Rahman | H04W 56/00 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.12.0, Dec. 2014, 1-195.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.0.0, Dec. 2013, 1-208.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.15.0, Dec. 2014, 1-312.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, Dec. 2013, 1-349.

3GPP, "3rd Generation Partnership Project; Technical Specification Group Radio Access Network; Evolved Universal Terrestrial Radio Access (E-UTRA); User Equipment (UE) radio transmission and reception (Release 10)", 3GPP TS 36.101 V10.17.0, Dec. 2014, 1-345.

3GPP, "3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.2.0, Dec. 2013, 1-507.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.13.0, Dec. 2014, 1-278.

Unknown, Author, "Extension of maximum number of band combinations", 3GPP TSG-RAN WG2#85, R2-140326, Intel Corporation, Prague, Czech Republic, Feb. 10-14, 2014, 1-4.

* cited by examiner

NODE AND METHOD FOR CARRIER AGGREGATION COMPATIBILITY REPORTING OF A WIRELESS DEVICE

TECHNICAL FIELD

Example embodiments presented herein are directed towards a base station, and corresponding method therein, for obtaining a carrier aggregation compatibility report comprising a subset of a total number of frequency band and/or frequency band combinations supported by a wireless device. Example embodiments presented herein are also directed towards a wireless device, and corresponding method therein, for providing a carrier aggregation compatibility report comprising a subset of a total number of frequency bands and/or frequency band combinations supported by the wireless device.

BACKGROUND

Carrier Aggregation

The 3rd Generation Partnership Project (3GPP) Long Term Evolution (LTE) specifications standardized Carrier Aggregation (CA) supporting Component Carrier (CC) bandwidths up to 20 MHz, which is the maximal LTE Rel-8 carrier bandwidth. Hence, an LTE operation wider than 20 MHz is possible and appear as a number of LTE carriers to an LTE terminal. An example of CA is illustrated in FIG. 1.

The 3GPP LTE standard supports up to 5 aggregated carriers where each carrier is limited in the Radio Frequency (RF) specifications to have one of six bandwidths, namely, 6, 15, 25, 50, 75 or 100 Resource Blocks (RB) corresponding to 1.4, 3, 5, 10, 15 and 20 MHz, respectively.

The number of aggregated CCs as well as the bandwidth of the individual CC may be different for uplink and downlink. A symmetric configuration refers to the case where the number of CCs in downlink and uplink is the same whereas an asymmetric configuration refers to the case that the number of CCs is different.

During initial access an LTE terminal operates on one carrier only. Upon successful connection to the network a terminal may, depending on its own capabilities and the network, be configured in Radio Resource Control (RRC) signalling with additional CCs in the Uplink (UL) and Downlink (DL). The 3GPP radio specifications, in example, 3GPP 36.101 v10.17.0, includes requirements for up to 2 CC DL and only 1 UL in Rel-10. In the Rel-12 version of this specification, 3 DL CA are being introduced as well as UL inter-band CA.

Wireless Device (e.g., UE) Radio Network Related Capability Information

The purpose of this procedure is to transfer UE radio access capability information from the User Equipment (UE) to Evolved Universal Mobile Telecommunications System Terrestrial Radio Access Network (E-UTRAN). If the UE has changed its E-UTRAN radio access capabilities, the UE shall request higher layers to initiate the necessary NAS procedures, as described in 3GPP TS 23.401 v10.13.0, section 5.11, which would result in the update of UE radio access capabilities using a new RRC connection.

To allow for a range of user equipment (UE)/wireless device implementations, different wireless device capabilities are specified. The wireless device capabilities may be used by the network to select a configuration that is supported by the wireless device. FIG. 2 illustrates an example of UE capability transfer.

In 3GPP standardization of E-UTRAN radio access, the UE radio network related capability information is transferred using Radio Resource Control (RRC) signalling from the UE (wireless device) to the eNode B (eNB or base station).

Information on the UE radio network related capability information has to be present in the eNB in the RRC connected state of the UE. Moreover, when a handover is made from a first/source eNB to a second/target eNB the UE capability information needs to be moved from the source eNB to the target eNB. However, in RRC idle state there is no need to maintain any information of the UE, including the UE capabilities, in the eNBs.

In order to avoid uploading the UE capabilities over the radio interface between the UE and the eNB each time the UE performs a transition to RRC connected state, for example, when the UE specific context is created in the eNB, the eNB uploads the UE capability information to the Mobility Management Entity (MME) in the Evolved Packet Core (EPC) so that it can be stored there when the UE is in RRC idle state. When the UE next time returns to RRC connected state the UE capability information will be downloaded from the MME to the eNB.

The UE radio network related capability information is grouped, where each group reflects a certain type of capabilities. Examples of such capability groups are Radio Frequency (RF) Parameters, measurement parameters, and Inter-RAT (Radio Access Technology) parameters. The RF-Parameters includes, for example, supported Evolved Universal Terrestrial Radio Access (EUTRA) frequency bands, supported EUTRA band combinations.

Measurement Parameters includes information about the UE need for DL measurement gaps while performing inter-frequency measurements when UE operating on a specific E-UTRA band or on a specific E-UTRA band combination. Inter-RAT Parameters includes information about the supported frequency bands for each other RAT the UE supports, as described in 3GPP TS 36.300, v10.12.0, section 18, and 3GPP TS 36.331, v10.15.0, section 5.6.3. In the following "UE capability" refers to the "UE radio network related capability".

Handover Preparation Procedure

Handover preparation procedure is used to transfer the RRC information related to one UE from source eNB/source RAT to target eNB including the UE capability information. The information will be used by the target eNB to appropriately configure the UE according to the UE capability and the eNB configuration/implementation in the following handover command sent to the UE.

SUMMARY

The current RRC signalling for the UE to report supported band combinations/single bands is limited to 128 different combinations/bands. The current status in 3GPP, for example, as provided for in Rel-11, is that the UE has to report all the combinations/bands that it supports, as the eNB must follow what is explicitly reported and may not make any assumptions as to what combinations or subsets of combinations the UE supports.

With the increase of number of CCs aggregated, it has been concluded in 3GPP that these 128 combinations will not be sufficient to report all possible bands/band combinations that the UE supports. Simply extending the 128 entries to a higher number was recently discussed in RAN2 (R2-140326), 'Extension of the maximum number of band combinations', and as part of the discussion it was concluded that the new length might have to be infinity. This would potentially mean a very large RRC message.

The number of possible bands/band combinations will not only increase due to added number of CCs aggregated, but also due to that UEs are expected to support more bands and band-combination to be able to function in many different areas of the world as well as support carrier aggregation in the different areas.

Thus, at least one example object of the example embodiments presented herein is to provide a means of reporting capability information of a wireless device in which an amount of utilized system resources may be reduced.

An example advantage provided by at least some of the example embodiments is that it is possible for a UE adjust its signalled UE capabilities, for example, supported band combinations, to what is needed by the eNB, and hence avoid signalling and network storage of excessive information. The existing signalling only allows for 128 band combinations.

A further example advantage is the possibility for the UE to only be required to report the relevant bands/band combinations for the specific network to which it is connected and/or for networks in the surrounding area. Yet another example advantage is the possibility for the eNB to understand how the UE capability information is built up when this information is received during handover preparation or from MME. Then the eNB based on its own configuration/implementation decides whether to request more UE capability information from the UE. Another example advantage is adding the possibility for the eNB to request additional UE capability information, additional supported band combinations, for example, for load balancing purposes and in the case of handover towards a target eNB supporting a different set of bands than the source eNB.

Accordingly, some of the example embodiments are directed towards a method, in a wireless device, for providing a carrier aggregation compatibility report comprising a subset of a total number of frequency bands and/or frequency band combinations supported by a wireless device. The wireless device is comprised in a communications network. The method comprises receiving, from a base station, parameters for selecting the subset. The method further comprises selecting the subset based on the received parameters. The method also comprises sending, to the base station, the selected subset in the carrier aggregation compatibility report.

Some of the example embodiments are directed towards a wireless device for providing a carrier aggregation compatibility report comprising a subset of a total number of frequency bands and/or frequency band combinations supported by the wireless device. The wireless device is comprised in a communications network. The wireless device comprises a receiving unit configured to receive, from a base station, parameters for selecting the subset. The wireless device further comprises a processing unit configured to select the subset based on the received parameters. The wireless device also comprises a transmitting unit configured to send, to the base station, the selected subset in the carrier aggregation compatibility report.

Some of the example embodiments are directed towards a method, in a base station, for obtaining a carrier aggregation compatibility report comprising subset of a total number of frequency bands and/or frequency band combinations supported by a wireless device. The base station is comprised in a wireless communications network. The method comprises determining parameters for selecting the subset. The method also comprises sending, to the wireless device, the parameters. The method further comprises receiving, from the wireless device, the carrier aggregation compatibility report comprising the subset.

Some of the example embodiments are directed towards a base station configured to obtain a carrier aggregation compatibility report comprising subset of a total number of frequency bands and/or frequency band combinations supported by a wireless device. The base station is comprised in a wireless communications network. The base station comprises a processing unit configured to determine parameters for selecting the subset. The base station further comprises a transmitting unit configured to send, to the wireless device, the parameters. The base station also comprises a receiving unit further configured to receive, from the wireless device, the carrier aggregation compatibility report comprising the subset.

DEFINITIONS

3GPP 3rd Generation Partnership Project
CA Carrier Aggregation
CC Component Carriers
CDMA Code Division Multiple Access
DL Downlink
eNB Evolve Node B
EPC Evolved Packet Core
EUTRA Evolved Universal Terrestrial Radio Access
EUTRAN Evolved UMTS Terrestrial Radio Access Network
GERAN GSM EDGE Radio Access Network
GSM Global System for Mobile Communication
IE Information Element
LTE Long Term Evolution
MME Mobility Management Entity
NAS Non-Access Stratum
NW Network
RAN Radio Access Network
RAT Radio Access Type
RB Resource Blocks
RF Radio Frequency
RRC Radio Resource Control
SIB System Information Block
UE User Equipment
UL Uplink
UTRA Universal Terrestrial Radio Access Network

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

It should be appreciated that the terms wireless device and user equipment (UE) may be used interchangeably. It should also be appreciated that the terms base station and eNodeB (eNB) may be used interchangeably. It should be appreciated that all example embodiments described herein may be utilized independently or in any combination with other example embodiments.

Example embodiments presented herein provide for means to limit the amount of UE capability information sent from UE to eNB based on the network/eNB needs derived from operator configuration and/or implementation. Since the operator configuration and needs may be different in different parts of the network, a static or first limited set of UE capabilities may not be sufficient. The example embodiments presented herein address this issue. First, a brief summary of the various embodiments will be presented. Thereafter, a more detailed description of the various embodiments will be provided.

Figure 3:
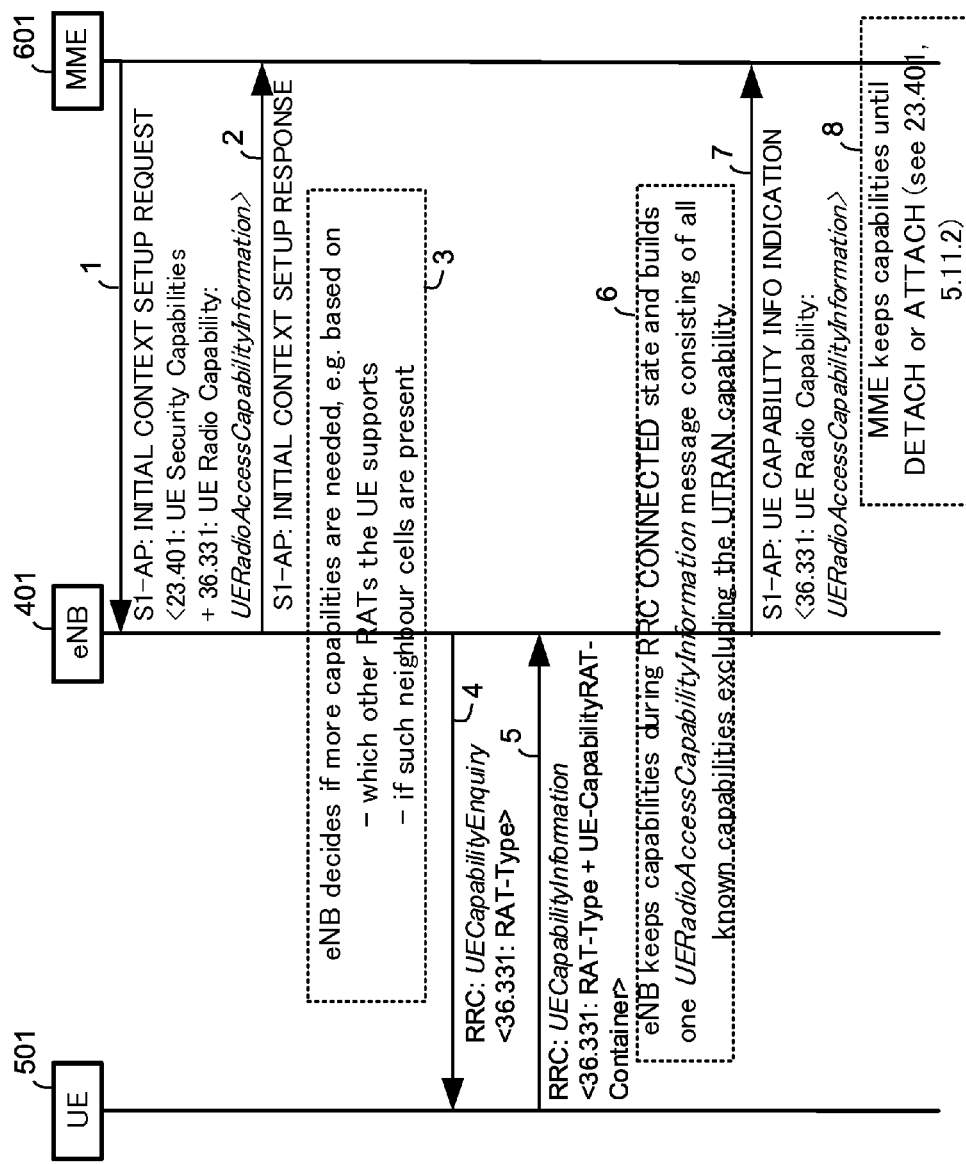
FIG. 3 is a message passing diagram of a wireless device, base station and MME for providing a carrier aggregation compatibility report, according to some of the example embodiments.

A general overview of some of the example embodiments presented above is provided in FIG. 3. FIG. 3 illustrates a signalling message diagram between a wireless device 501, a base station 401 and a MME 601. First, the MME 601 will send a context request message to the base station 401 (message 1). Thereafter, the base station 401 may send a context setup response to the MME 601 (message 2). Upon context establishment, the base station may decide if more capabilities are needed (operation 3). For example, the base station want information regarding the frequency bands and/or frequency band combinations supported by the wireless device 501. Thus, the base station may send an enquiry message to the wireless device (message 4).

The message may comprise parameters for selecting the subset of a total number of frequency bands and/or frequency band combinations supported by the wireless device. Such a subset is useful as it minimizes the amount of information which is sent thereby reducing the use of system resources.

According to some of the example embodiments, the eNB informs the UE of the different bands that it supported, either by the eNB itself, by the "local" network (could be geographically based or based in eNB knowledge about neighbouring eNBs/cells) or by the whole operator network. The eNB could also include information such as its network supported bands/CA combinations, or band or band combination for surrounding cells or similar. The UE will then report the band or band combinations that it supports that matches those bands that the eNB request. The example embodiments presented herein are applicable, both when the UE includes and does not include additional supported band combinations that are not requested by the current eNB or network (additional band combinations may be subject to room left in the reported information element).

According to some of the example embodiments, the eNB provides the UE with information about certain parts of the UE's capabilities that it would like to be informed about or information that the UE can use to derive what information is relevant to the eNB. The UE will then make sure to include this information in the applicable UE capability signalling, and may (but is not required to) as a result exclude other types of information that is not relevant to the eNB.

The wireless device may thereafter select the subset based on the provided parameters and send the subset to the base station in a carrier aggregation compatibility report (message 5). According to some of the example embodiments, the UE includes band combinations that cannot fit in existing information element into a new info element in the same message.

According to some of the example embodiments, the UE includes band combinations that cannot fit in existing information elements into another message. According to some of the example embodiments, introducing the capability enquiry by the eNB for specific bands only, the Carrier Aggregation capability of the UE known to the serving eNB may not be the complete list of all bands/band combinations supported by the UE. At handover preparation, the source eNB forwards the UE capability to the target eNB. Since the existing UE Evolved Universal Mobile Telecommunications System (UMTS) Terrestrial Radio Access Network (EU-TRAN) capability only contains up to 128 supported bands/band combinations, it is not possible for the target eNB to know whether the received capability comprises the complete UE capability or if the UE supports more bands/band combinations. Furthermore, the target eNB is not aware how the received bands/bands combinations are built up and if UE supports other types of band combinations.

The CA band configurations could be different in each eNB depending on, for example, 1) frequency bands and carrier frequencies supported by the eNB; 2) the current situation of the traffic load on each carrier on which the eNB is operating; 3) the availability of frequency bands and carrier frequencies in the neighbouring eNBs, etc. So different eNBs may be interested in different bands/band combinations and consequently there is a need for the target eNB to find out whether certain other bands/band combinations are supported by the UE.

According to some of the example embodiments, when the UE reports the UE capability, for example, supported bands/band combinations, based on a list of requested capability types, for example, the list of frequency bands, requested by the eNB, the UE also includes the same list of requested capability types, for example, the list of frequency bands, as part of the reported UE capability. The target eNB uses this information to understand whether to request addition UE capabilities from the UE or not.

According to some of the example embodiments, at handover preparation the source eNB forwards the list of requested capability types the eNB has requested the UE to report, for example, the list of frequency bands to which eNB has requested the UE to report the corresponding supported bands/band combinations at UE capability enquiry to the target eNB. The target eNB uses this information to understand whether to request addition UE capabilities from the UE or not.

Figure 4:
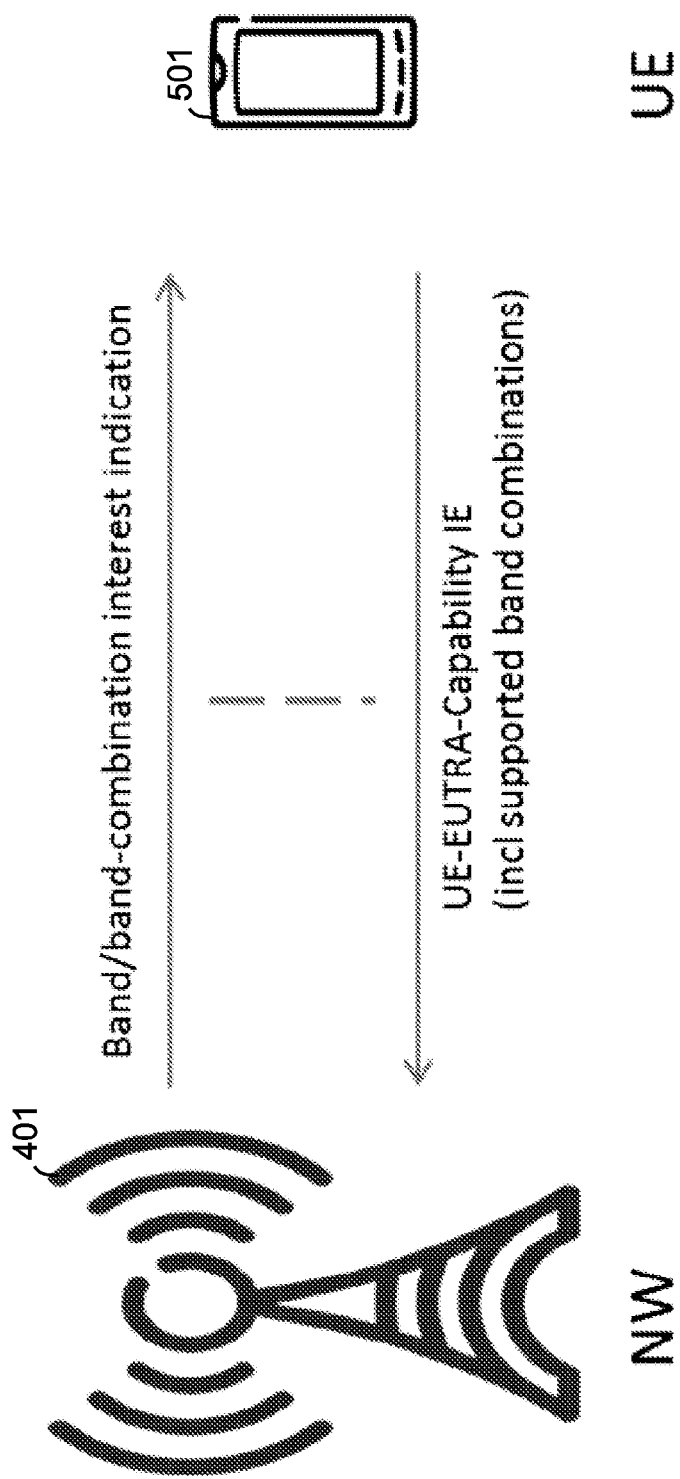
FIGS. 4 and 5 are illustrative examples of carrier aggregation compatibility information exchange between a base station and a wireless device, according to some of the example embodiments presented herein.

The base station 401 may keep a record of the determined subset (operation 6). The base station may thereafter send the determined subset to the MME 601 (message 7). The MME 601 may be configured to maintain the determined subset until an attach or detach of the wireless device (operation 8). According to some of the example embodiments, at connection establishment in an eNB, the eNB receives from MME the UE capabilities, together with information on what parts of UE capabilities that has potentially been requested and collected by other eNBs from this UE.

eNB Provides UE with a Set of Frequency Band Indications and UE Responds with Supported Band Combinations of these Bands An example overview of example embodiments described under this subheading is provided in FIG. 4. According to some of the example embodiments, the eNB or base station 401 informs the UE or wireless device 501 of which bands and/or band combinations of interest to make it possible for the UE to only report the subset of its supported bands/band combinations that are of interest to the eNB, as is illustrated in FIG. 4 and message 4 of FIG. 3.

Bands and/or band-combinations that are of interest for the eNB could for example be, but is not limited to, bands in which cells are deployed in this eNB, bands which are deployed across the network applicable for the specific operator(s) utilizing this eNB, or bands that are of interest within a well-defined geographical area wherein the UE is expected to remain for the duration of its connection.

The exact bands or band combinations that the eNB indicates interest in may vary and could be dependent on for example eNB implementation or deployment. The example embodiments are not limited in any way as to how the eNB decides which bands or band-combinations to show interest in.

According to some of the example embodiments, the eNB indicates interest for all the UEs supported bands or band-combinations. If the number of UE-supported band-combinations exceeds the number possible to report, the UE may prioritize which band-combinations to include. The example embodiments are not limited by how and if the UE does such prioritization.

According to some of the example embodiments, the eNB broadcasts specific bands and/or band-combinations that are of interest as part of System Information Block (SIB). The SIB used could for example be, but is not limited to, SIB5.

According to some of the example embodiments, the eNB includes a list of specific bands and/or band combinations that are of interest in dedicated signalling, for example, as part of the UE Capability Enquiry or a new message sent from eNB to UE. One example implementation could be to add a list of bands or band-combinations to UECapabilityEnquiry IE.

Example implementation:
E.g. eNB indicates interest in band A, band B, band C
UE supports CA between band A+band B, band B+band C and band A+band D
The UE only has to report the first two combinations. The eNB/network (NW) can anyway not configure the UE with a CA combination for band A+band D so knowing that the UE can do this combination is not useful information from a Carrier Aggregation function perspective.

Existing UE Capabilities can be requested by eNB not only at UE attach, but basically any time later on as well, the same should apply for any new UE capability request signalling.

eNB Indicated Interest in Certain Parts of UE Capabilities

Figure 5:
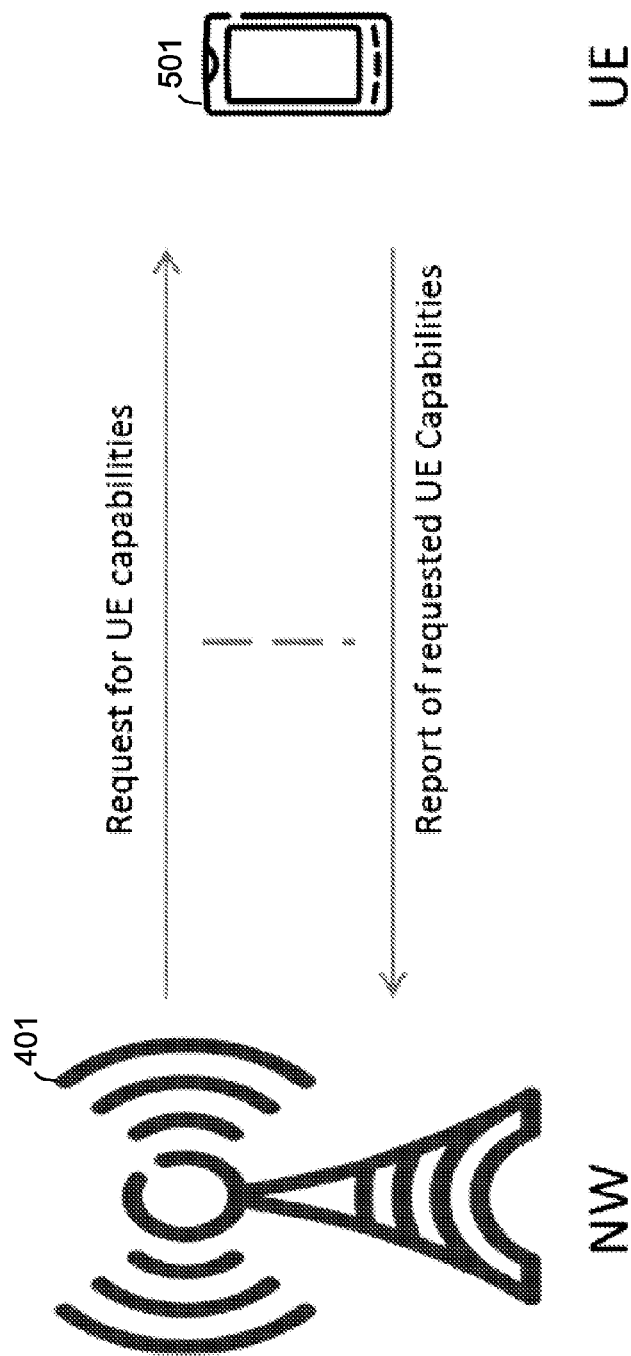

An overview of the example embodiments presented under this subheading is provided in FIG. 5. According to some of the example embodiments, the eNB or base station 401 will provide the UE or wireless device 501 with information about certain parts of the UE's capabilities that it would like to be informed about or information that the UE can use to derive what information what information is relevant to the eNB, as illustrated in FIG. 5 and message 4 or FIG. 3. The UE will then include this information is response signalling, and may (but is not required to) as a result exclude other types of information that is not relevant to the eNB.

The eNB can either request certain parts of UE capabilities by explicitly stating what information it wants or do not want, alternatively can it do implicit request by expressing certain information that it is interested in and have the UE derive the capability information applicable for what this specific eNB needs/wants. The implicit way is similar to how the eNB (as described under the subheading 'eNB provides UE with a set of frequency band indications and UE responds with supported band combinations of these bands') indicates interest in band A+B+C and the UE then reports the applicable band-combinations related to those bands.

The example embodiments presented herein are not limited to using RRC signalling.

The information of interest as indicated by the eNB may concern certain bands, band-combinations or some other part of the UE capabilities. Examples are Inter-Radio Access Type (RAT) Capabilities
In existing Evolved Universal Terrestrial Radio Access (EUTRA) signalling, it is already possible for eNB to request (or omit to request) Universal Terrestrial Radio Access Network (UTRA)-specific, Global System for Mobile Communication (GSM) EDGE Radio Access Network (GERAN)-specific, Code Division Multiple Access (CDMA)-2000 specific capabilities, but it is not possible for the eNB to request (or omit to request) the UTRA/GERAN/CDMA2000-related capabilities within the EUTRA capabilities.

Band/band comb/band combination set specific capabilities.
eNB could indicate to UE to e.g. omit specific capabilities related to features not supported by the eNB.
The purpose of such example embodiments is to protect the general principle that eNB may only be interested in a subset of the UE's capability and that informing the UE of this may be used to limit the content and size of the reported UE capabilities.

Extensions to the SupportedBandCombination IE
According to some of the example embodiments, the UE will first include bands/band-combinations in the available spaces/slots of existing SupportedBandCombination Information Element (IE), or any other IE, and mark with a flag or similar that it has more supported combinations. The UE will then continue to include the additional band-combinations in an additional IE in the same message.

UE Indicates in Response that UE Supports More Band Combinations than can Fit in the Response Message According to some of the example embodiments, the UE will include supported band combinations in the available fields of SupportedBandCombination IE. If UE supports more band combinations than it can fit, the UE indicates this to the eNB by setting flags where UE indicates UE supports additional band combinations of the bands requested by eNB UE supports additional band combinations on any bands In an example implementation, the eNB may, but is not required to, use this information to request additional UE capabilities.

According to some of the example embodiments, when the eNB knows that it has not received the full list of supported band/band-combinations from the UE, the eNB may use other information elements received from the UE to decide to request any additional band combinations from UE. One example is supportedBandListEUTRA, that comprise the bands supported by UE.

UE CA Capability at Handover

UE-reported capabilities to one eNB may not be complete and may not fulfill the need of a target eNB. In particular, this may be the case for supported band combinations.

1) According to some of the example embodiments, when the UE responses with the supported bands/band combinations, the UE also adds the same list of frequency bands as received in the enquiry from the eNB, together with to the reported UE EUTRAN capability sent to the eNB. Then this information will be forwarded to the target eNB in the handover preparation signalling as part of the UE EUTRAN capability container.

2) According to some of the example embodiments, if the UE supports more bands/band combinations than requested, e.g., with different frequency bands, it also includes one indication that it supports more bands/band combinations as an extension in the current UE EUTRAN capability. Then this indication will also be forwarded to the target eNB at handover preparation.

3) According to some of the example embodiments, where the eNB requested certain parts or full UE capability information, the UE also adds the same request as received from eNB in an extension to the reported UE EUTRAN capability sent as response to the eNB. Then this information will be forwarded to the target eNB in the current handover preparation signalling as part of the UE EUTRAN capability container.

According to some of the example embodiments, when the source eNB forwards the UE EUTRAN capability information to the target eNB, the source eNB also includes in the handover preparation signalling towards the target eNB:

1) The list of frequency bands, if any, that the source eNB has included in the UE capability enquiry and that reflect how the UE supported bands/band combinations are built up.

2) If the UE responses with an indication that it has more bands/band combination, the source eNB also forwards this indication to the target eNB. and/or 3) The list of other specific parts of the UE capability that were requested from UE.

UE CA Capability Storage in MME Between UE Connections

The example embodiments described in the above section are also applicable for how UE capabilities are signalled from eNB to MME to be stored and later retained when UE enters connected mode in same or other eNB. This is also described in operation 8 of FIG. 3.

According to some of the example embodiments, the UE capability information is extended with an information element that comprises information on how the UE capabilities have been collected by eNBs. At the very first connection establishment during network attach, the MME has no UE capability information to provide to the eNB, and the eNB has to request the UE capability information from the UE, for example, by indicating a set of frequency bands to the UE (as described under the subheading entitled 'eNB provides UE with a set of frequency band indications and UE responds with supported band combinations of these bands') or more general (as described under the subheading entitled 'eNB indicated interest in certain parts of UE capabilities').

Figure 1:
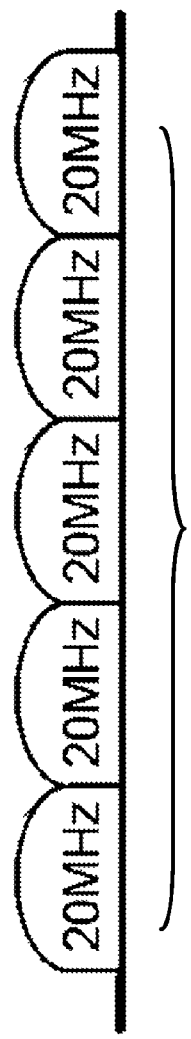
FIG. 1 is an illustrative example of carrier aggregation.
Figure 2:
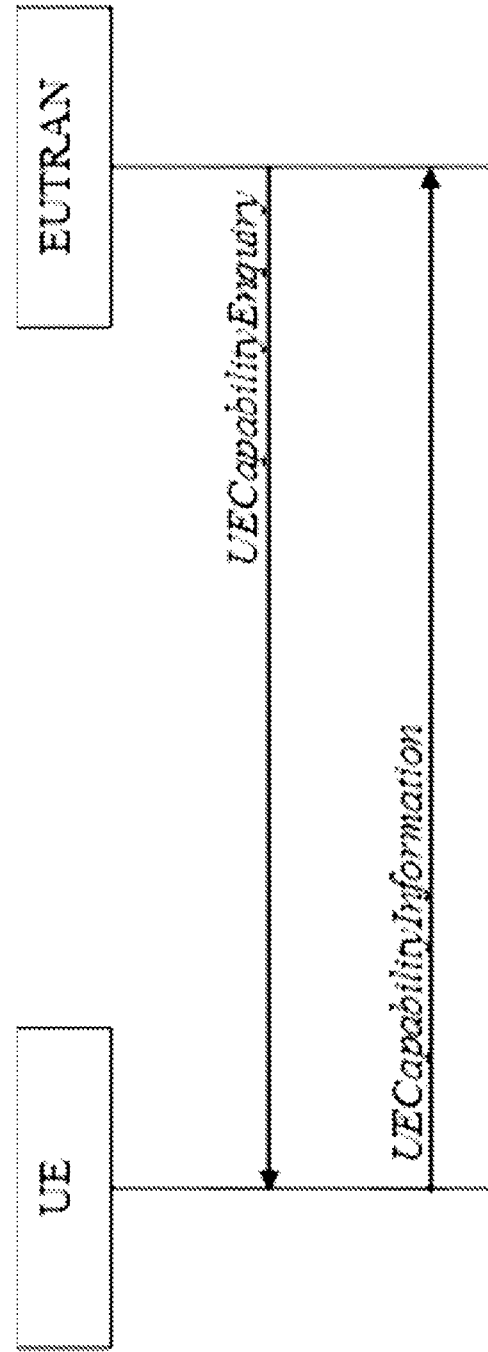
FIG. 2 is a message passing diagram illustrating a wireless device sending a group capability information to a base station.

According to some of the example embodiments, in the response message, the UE acts according to the example embodiments described under the subheading 'UE CA capability at handover', and the eNB sends the UE capabilities to MME (UE CAPABILITY INFO INDICATION, FIG. 2). At a subsequent connection request from UE, the MME will now have UE capability information that includes information how the previous eNB(s) collected the UE capabilities (e.g. as a list of previously requested frequency bands). eNB may choose to signals all or part of this information, together with its own requested information (e.g. additional frequency bands) to UE In the response message. In the response message, the UE includes the same list of frequency bands as received in the enquiry from the eNB into the new field of the UE capability information. The eNB sends the UE capabilities to MME (UE CAPABILITY INFO INDICATION, FIG. 2).

According to some of the example embodiments, a new information element is introduced in the signalling between the eNB and MME to carry the information on how the UE capabilities have been collected by eNBs.

Example Node Configurations

Figure 6:
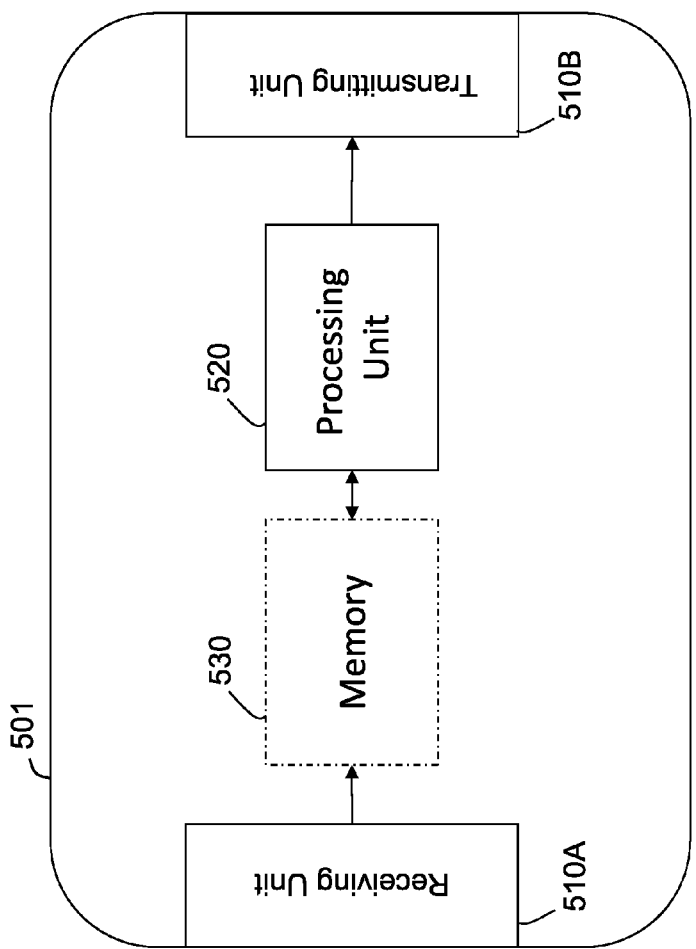
FIG. 6 is an illustration of an example node configuration of a wireless device, according to some of the example embodiments presented herein.

FIG. 6 illustrates an example of a user equipment/wireless device which may incorporate some of the example embodiments discussed above. As shown in FIG. 6, the wireless device 501 may comprise a receiving unit 510A and transmitting unit 510B configured to receive and transmit, respectively, any form of communications or control signals within a network. It should be appreciated that the receiving unit 510A and transmitting unit 510B may be comprised as any number of transceiving, receiving, and/or transmitting units, modules, or circuitry. It should further be appreciated that the receiving unit 510A and transmitting unit 510B may be in the form of any input/output communications port known in the art. The receiving unit 510A and transmitting unit 510B may comprise RF circuitry and baseband processing circuitry (not shown).

The wireless device 501 may further comprise at least one memory unit or circuitry 530 that may be in communication with the receiving unit 510A and transmitting unit 510B. The memory 530 may be configured to store received or transmitted data and/or executable program instructions. The memory 530 may be any suitable type of computer readable memory and may be of volatile and/or non-volatile type.

The wireless device 501 may further comprise further processing unit 520 which may be configured to provide compatibility reports. The processing unit 520 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Figure 7:
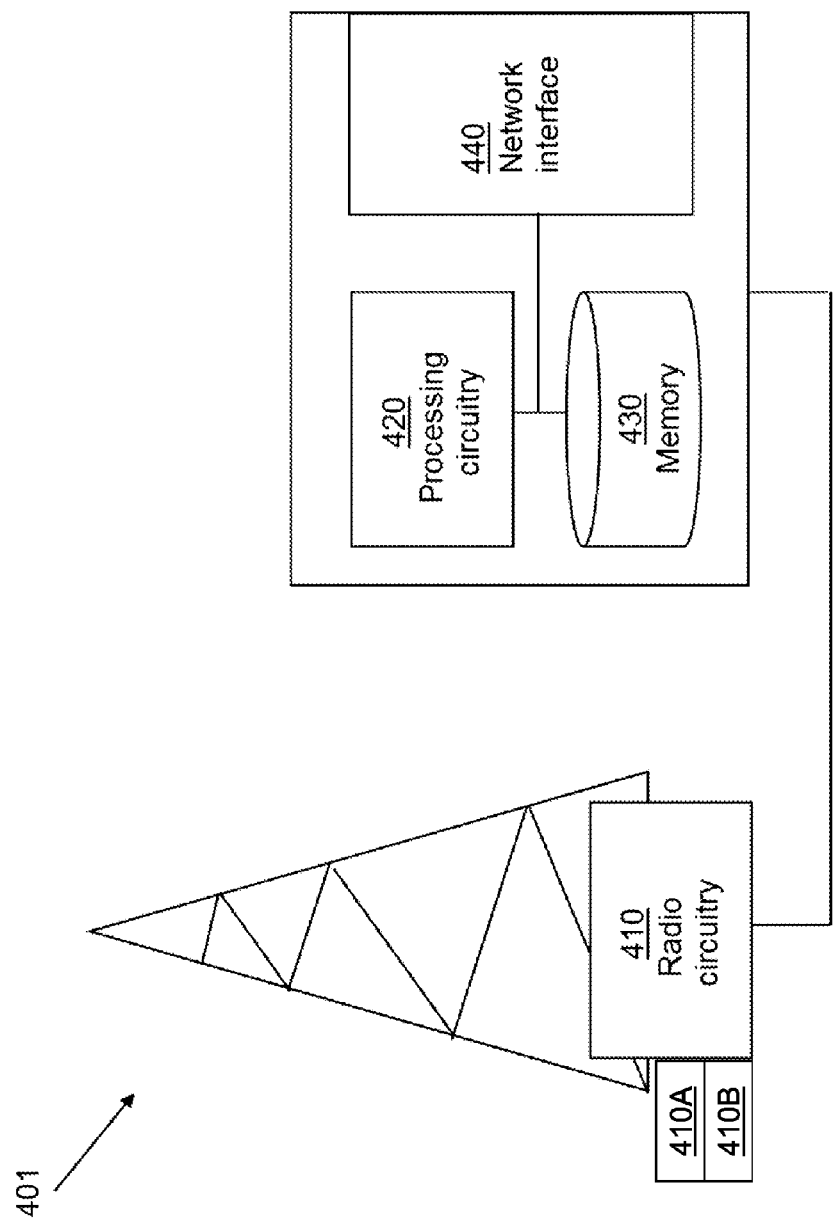
FIG. 7 is an illustration of an example node configuration of a base station, according to some of the example embodiments presented herein.

FIG. 7 illustrates an example of a base station 401 which may incorporate some of the example embodiments discussed above. As shown in FIG. 7, the base station 401 may comprise a receiving unit 410A and transmitting unit 410B configured to receive and transmit, respectively, any form of communications or control signals within a network. It should be appreciated that the receiving unit 410A and transmitting unit 410B may be comprised as any number of transceiving, receiving, and/or transmitting units, modules or circuitry. It should further be appreciated that the receiving unit 410A and transmitting unit 410B may be in the form of any input/output communications port known in the art. The receiving unit 410A and transmitting unit 410B may comprise RF circuitry 410 and baseband processing circuitry (not shown).

The base station 401 may further comprise at least one memory unit or circuitry 430 that may be in communication with the receiving unit 410A and transmitting unit 410B. The memory 430 may be configured to store received or transmitted data and/or executable program instructions. The memory 430 may be any suitable type of computer readable memory and may be of volatile and/or non-volatile type.

The base station 401 may further comprise a network interface 440 and processing unit 420 which may be configured to analyse or prepare requests for compatibility data as described herein. The processing unit 420 may also be configured to provide configuration instructions to the user equipment or wireless device. The processing unit 420 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Example Node Operations

Figure 8A:
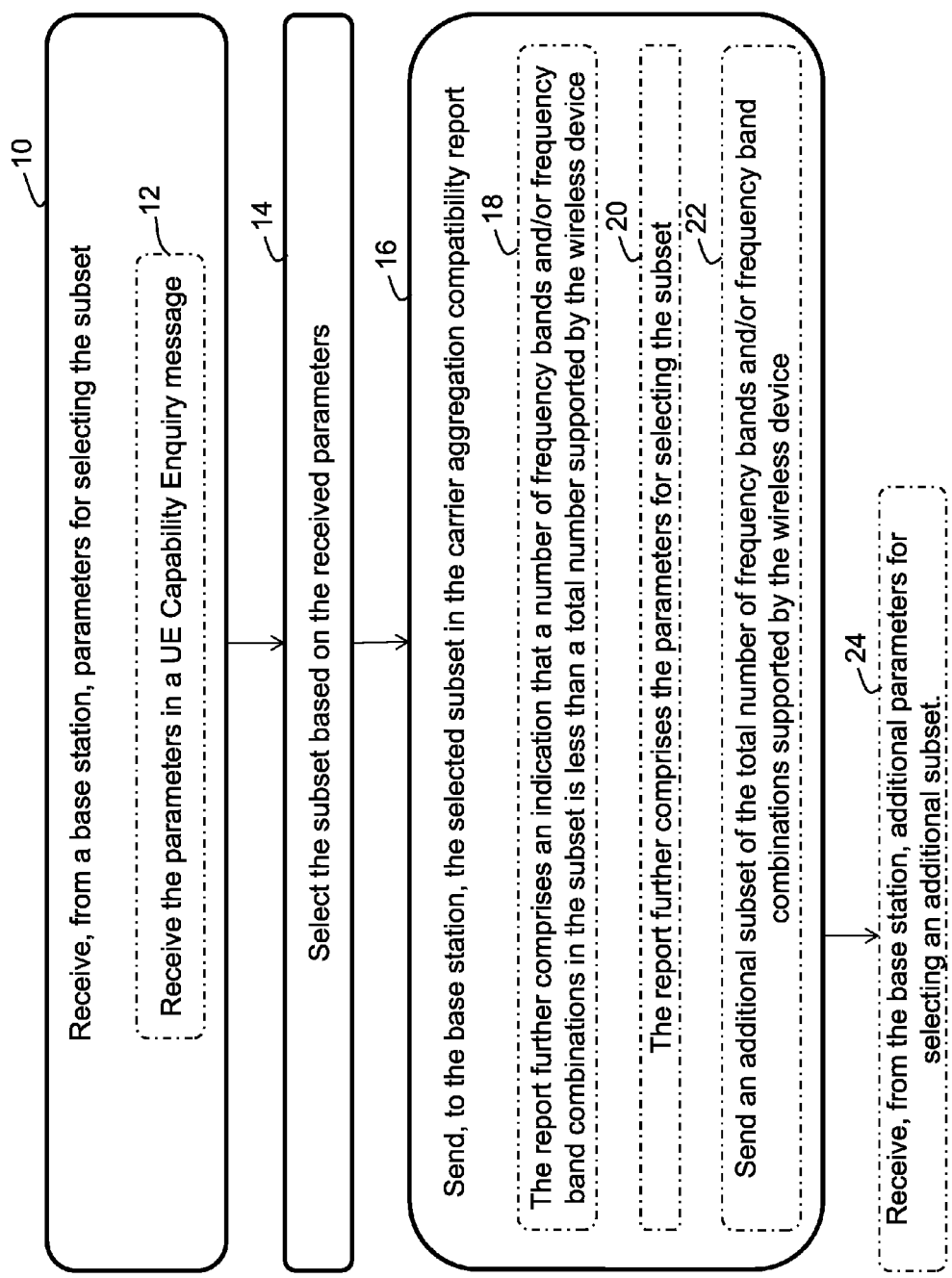
FIG. 8A is a flow diagram of example operations which may be taken by the wireless device of FIG. 6, according to some of the example embodiments.

FIG. 8A is a flow diagram depicting example operations which may be taken by the wireless device for providing a carrier aggregation capability report comprising a subset of a total number of frequency band and/or frequency band combinations supported by a wireless device, as described herein. It should also be appreciated that FIG. 8A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 8B:
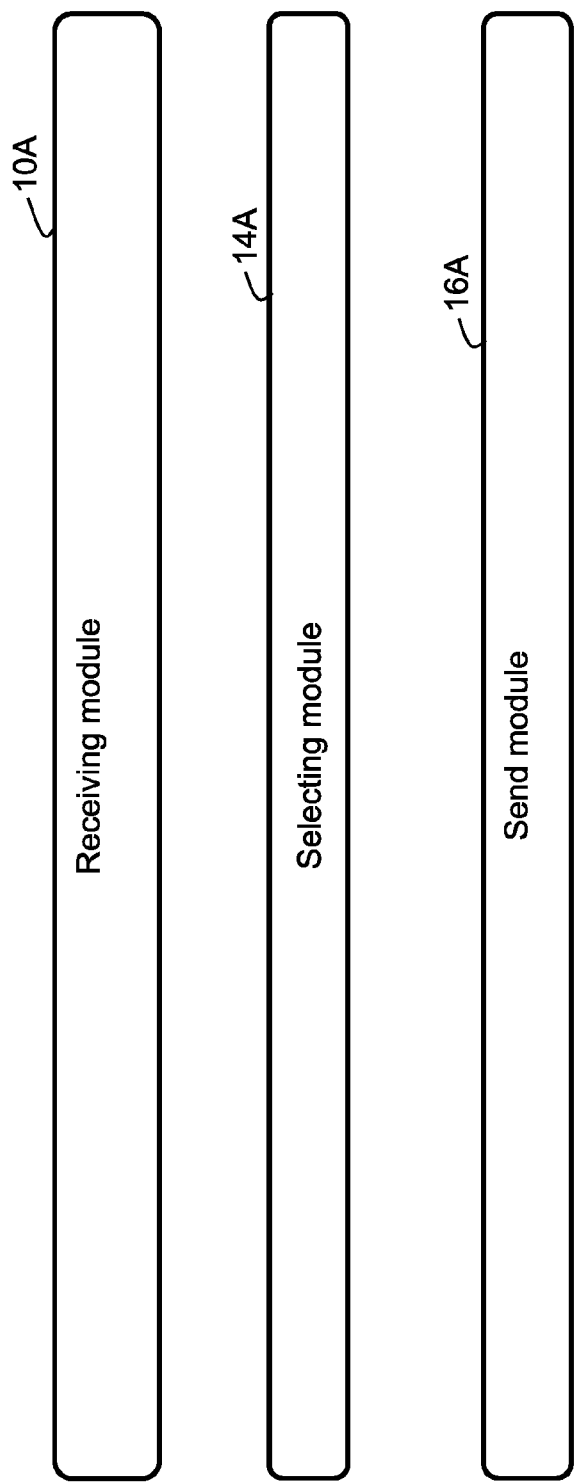
FIG. 8B is an illustration of modules which may perform at least some of the operations of FIG. 8A, according to some of the example embodiments.

FIG. 8B is a module diagram describing modules of the wireless device according to some of the example embodiments herein.

Operation 10

The wireless device 501 is configured to receive 10, from a base station 401, parameters for selecting the subset. The receiving unit 510A is configured to receive, from the base station, the parameters for selecting the subset. The receiving module 10A is configured to perform operation 10.

According to some of the example embodiments, the received parameters may comprise at least one frequency band and/or at least one frequency band combination supported by the base station. It should be appreciated that the supported frequency band and/or supported frequency band combinations may be supported by the base station 401. In such an instance, the parameters may be in the form of an implicit request for a certain frequency band or frequency band combination.

The supported frequency band and/or supported frequency band combinations may be supported by the local network. Such parameters may be based on geographical information of the wireless device, the base station and/or other base stations. The parameters may be based on knowledge regarding neighboring base station or cells. The supported frequency band and/or supported frequency band combinations may be supported by the operator network.

According to some of the example embodiments, the parameters may be based on pre-configured rules. An example of such pre-configured rules may be to provide parameters instructing the wireless device to report all frequency band combinations featuring a first predetermined number of component carriers. According to some of the example embodiments, if the number of frequency band combinations in a resulting subset is less than 128, the pre-configured rules may further provide parameters instructing the wireless device to report all frequency band combinations featuring a second predetermined number, wherein the second predetermined number is larger than the first predetermined number.

It should be appreciated that the pre-configured rules may be to provide parameters instructing the wireless device to report frequency bands and/or frequency band combinations according to any means of selection or criteria discussed herein.

Example Operation 12

According to some of the example embodiments, the receiving 10 further comprises receiving 12, from the base station, the parameters in a UE capability Enquiry message. The receiving unit 510A is configured to receive, from the base station, the parameters in a UE capability Enquiry message.

It should be appreciated that other messages may be used for providing the parameters. According to some of the example embodiments, the parameters may be provided in a UECapabilityEnquiry IE.

Operation 14

The wireless device 501 is further configured to select 14 the subset based on the received parameters. The processing unit 520 is configured to select the subset based on the received parameters. The selecting module 14A is configured to perform operation 14.

Operation 16

The wireless device 501 is also configured to send 16, to the base station, the selected subset in the carrier aggregation capability report. The transmitting unit 510B is configured to send, to the base station, the selected subset in the carrier aggregation capability report. The sending module 16A is configured to perform operation 16.

Example Operation 18

According to some of the example embodiments, the sending 16 further comprises sending 18 the carrier aggregation compatibility report, wherein the report comprises an indication that a number of frequency bands and/or frequency band combinations in the subset is less than a total number of frequency bands and/or frequency band combinations supported by the wireless device. The transmitting unit 510B is configured to send the carrier aggregation compatibility report as described above.

According to some of the example embodiments, the indication may be in the form of a flag, cause code, IE or based on a message type of the message used for sending the carrier aggregation compatibility report.

Example Operation 20

According to some of the example embodiments, the sending 16 further comprises sending 20 the carrier aggregation compatibility report, wherein the report comprise the parameters for selecting the subset. The transmitting unit 510B is configured to send the carrier aggregation compatibility report as described above.

According to some of the example embodiments, such information may be related to the wireless device's capability to operate on certain frequency bands and RATs. Such information may be provided at any time. According to some of the example embodiments, the parameters are comprised in a UERadioAccessCapabilityInformation information element.

Example Operation 22

According to some of the example embodiments, the sending 16 further comprises sending 22, to the base station, an additional subset of a total number of frequency bands and/or frequency band combinations supported by the wireless device. The transmitting unit 510B is configured to send, to the base station, the additional subset of the total number of frequency bands and/or frequency band combinations supported by the wireless device.

According to some of the example embodiments, the additional subset may be provided as a result of the base station sending a subsequent request for the additional subset or the wireless device may send the additional subset on its own initiative.

According to some of the example embodiments, the additional subset may be sent in the same message as the original subset as described in operations 10-20. Thus, the additional subset may be provided via an additional IE. According to some of the example embodiments, the additional subset may be sent in a subsequent message sent by the wireless device.

According to some of the example embodiments, the additional subset may be provided based on the parameters sent by the base station. According to some of the example embodiments, the additional subset may be provided based on a pre-configuration of the wireless device, which need not be based on the parameters provided by the base station.

Example Operation 24

According to some of the example embodiments, the wireless device may be further configured to receive 24, from the base station, additional parameters for selecting an additional subset of a total number of frequency bands and/or frequency band combinations supported by the wireless device. The receiving unit 510A is configured to receive, from the base station, the additional parameters for selecting the additional subset of the total number of frequency bands and/or frequency band combinations supported by the wireless device.

Figure 9A:
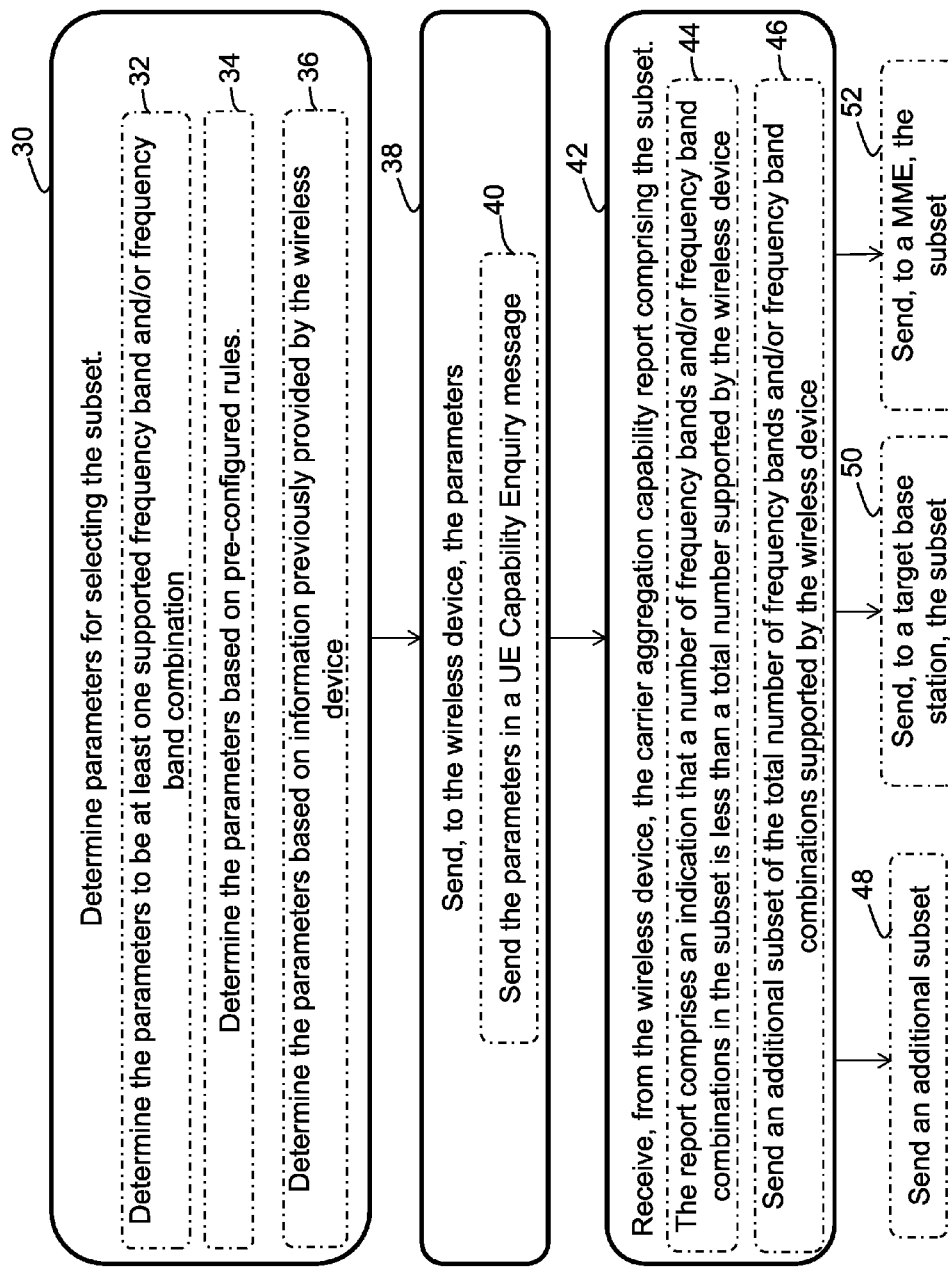
FIG. 9A is a flow diagram of example operations which may be taken by the base station of FIG. 7, according to some of the example embodiments.

FIG. 9A is a flow diagram depicting example operations which may be taken by the base station for obtaining a carrier aggregation capability report comprising a subset of a total number of frequency band and/or frequency band combinations supported by a wireless device, as described herein. It should also be appreciated that FIG. 9A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 9B:
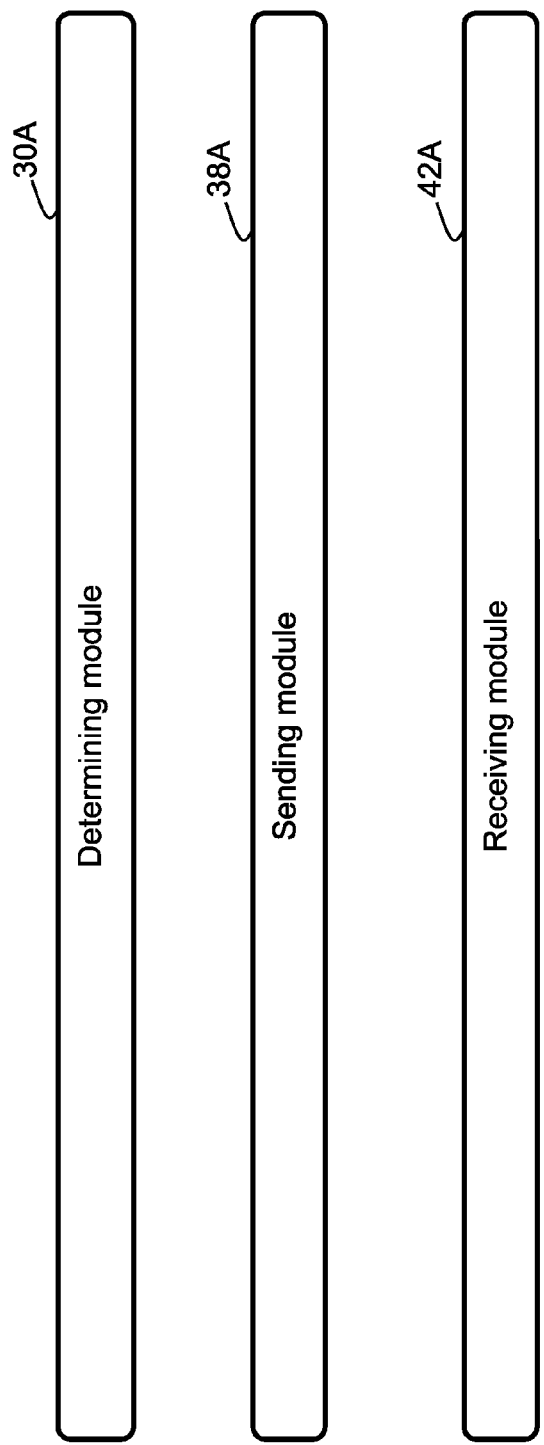
FIG. 9B is an illustration of modules which may perform at least some of the operations of FIG. 9A, according to some of the example embodiments.

FIG. 9B is a module diagram describing modules of base station according to some of the example embodiments herein.

Operation 30

The base station 401 is configured to determine 30 parameters for selecting the subset. The processing unit 420 is configured to determine the parameters for selecting the subset. The determining module 30A is configured to perform operation 30.

Example Operation 32

According to some of the example embodiments, the determining 30 further comprises determining 32 the parameters to be at least one supported frequency band and/or at last one supported frequency band combination. The processing unit 420 is configured to determine the parameters to be at least one supported frequency band and/or at least one supported frequency band combination.

It should be appreciated that the supported frequency band and/or supported frequency band combinations may be supported by the base station 401. In such an instance, the parameters may be in the form of an implicit request for a certain frequency band or frequency band combination.

The supported frequency band and/or supported frequency band combinations may be supported by the local network. Such parameters may be based on geographical information of the wireless device, the base station and/or other base stations. The parameters may be based on knowledge regarding neighboring base station or cells. The supported frequency band and/or supported frequency band combinations may be supported by the operator network.

Example Operation 34

According to some of the example embodiments, the determining 30 further comprises determining 34 the parameters based on pre-configured rules. The processing unit 420 is configured to determine the parameters based on pre-configured rules.

An example of such pre-configured rules may be to provide parameters instructing the wireless device to report all frequency band combinations featuring a first predetermined number of component carriers. According to some of the example embodiments, if the number of frequency band combinations in a resulting subset is less than 128, the pre-configured rules may further provide parameters instructing the wireless device to report all frequency band combinations featuring a second predetermined number, wherein the second predetermined number is larger than the first predetermined number.

It should be appreciated that the pre-configured rules may be to provide parameters instructing the wireless device to report frequency bands and/or frequency band combinations according to any means of selection or criteria discussed herein. It should be appreciated that such rules may be pre-configured (or saved) within the base station.

Example Operation 36

According to some of the example embodiments, the determining 30 further comprises determining 36 the parameters based on information previously provided by the wireless device. The processing unit 420 is configured to determine the parameters based on information previously provided by the wireless device.

According to some of the example embodiments, such information may comprise parameters comprising information about the wireless device's capability to operate on certain frequency bands and RATs.

Operation 38

The base station 401 is further configured to send 38, to the wireless device 501, the parameters. The transmitting unit 410B is configured to send, to the wireless device, the parameters. The sending module 38A is configured to perform operation 38.

Example Operation 40

According to some of the example embodiments, the sending 38 further comprises sending 40, to the wireless device, the parameters in a UE Capability Enquiry message. The transmitting unit 410B is configured to send, to the wireless device, the parameters in the UE Capability Enquiry message.

According to some of the example embodiments, the parameters may be provided in a UECapabilityEnquiry information element.

Operation 42

The base station 401 is further configured to receive 42, from the wireless device 501, the carrier aggregation compatibility report comprising the subset. The receiving unit 410A is configured to receive, from the wireless device, the carrier aggregation compatibility report comprising the subset. The receiving module 42A is configured to perform operation 42.

According to some of the example embodiments, the carrier aggregation compatibility report further comprises the parameters utilized in selecting the subset. According to some of the example embodiments, the subset and/or the parameters may be provided in a same IE an UERadioAccessCapabilityInformation IE. It should be appreciated that any other IE or message may be utilized.

Example Operation 44

According to some of the example embodiments, the receiving 42 further comprises receiving 44, from the wireless device, the carrier aggregation compatibility report comprising an indication that a number of frequency bands and/or frequency band combinations in the subset is less than a total number of frequency bands and/or frequency band combinations supported by the wireless device. The receiving unit 410A is configured to receive, from the wireless device, the carrier aggregation compatibility report comprising an indication that a number of frequency bands and/or frequency band combinations in the subset is less than a total number of frequency bands and/or frequency band combinations supported by the wireless device.

According to some of the example embodiments, the indication may be in the form of a flag, cause code, information element or a message type of the message in which the carrier aggregation compatibility report is received.

Example Operation 46

According to some of the example embodiments, the receiving 42 further comprises receiving 46, from the wireless device, an additional subset of a total number of frequency bands and/or frequency band combinations supported by the wireless device. The receiving unit 410A is configured to receive, from the wireless device, an additional subset of a total number of frequency bands and/or frequency band combinations supported by the wireless device.

According to some of the example embodiments, the additional subset may be provided as a result of the base station sending a subsequent request for the additional subset or the wireless device may send the additional subset on its own initiative.

According to some of the example embodiments, the additional subset may be sent in the same message as the original subset as described in operations 30-44. Thus, the additional subset may be provided via an additional IE.

According to some of the example embodiments, the additional subset may be sent in a subsequent message sent by the wireless device. According to some of the example embodiments, the additional subset may be provided based on the parameters sent by the base station. According to some of the example embodiments, the additional subset may be provided based on a pre-configuration of the wireless device, which need not be based on the parameters provided by the base station.

Example Operation 48

According to some of the example embodiments, the base station is further configured to send 48, to the wireless device, additional parameters for selecting an additional subset of the total number of frequency bands and/or frequency band combinations supported by the wireless device. The transmitting unit 410B is configured to send, to the wireless device, the additional parameters for selecting the additional subset of the total number of frequency bands and/or frequency band combinations supported by the wireless device.

Example Operation 50

According to some of the example embodiments, the base station is a source base station. Such example embodiments may further comprise sending 50, to a target base station, the subset during a handover of the wireless device. The transmitting unit 410B is configured to send, to the target base station, the subset during the handover of the wireless device.

According to some of the example embodiments, the subset (and the additional subset if provided) may be provided to the target base station in a handover preparation message or a UERadioAccessCapabilityInformation IE, exactly as received from the wireless device. According to some of the example embodiments, the subset (and the additional subset if provided) may be provided to the target base station in a new message.

According to some of the example embodiments, the provided subset(s) may further comprise the parameters used to select the subset(s). According to some of the example embodiments, the provided subset(s) may comprise an indication that the subset(s) are additional subset(s) of a total number of frequency bands and/or frequency band combinations supported by the wireless device.

Example Operation 52

According to some of the example embodiments, the base station is further configured to send 52, to a MME, the subset. The transmitting unit 410B is configured to send, to the MME, the subset.

According to some of the example embodiments, the base station may be further configured to retrieve the subset information provided to the MME (by the same or another base station) when the wireless device enters a connected mode.

According to some of the example embodiments, the subset (and the additional subset if provided) may be provided to the MME in a UE Capability Info Indication message or a UERadioAccessCapabilityInformation IE as received by the wireless device. According to some of the example embodiments, the subset (and the additional subset if provided) may be provided to the MME in a new message.

According to some of the example embodiments, the provided subset(s) may further comprise the parameters used to select the subset(s). According to some of the example embodiments, the provided subset(s) may comprise an indication that the subset(s) are additional subset(s) of a total number of frequency bands and/or frequency band combinations supported by the wireless device.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a user equipment, as measuring or recording unit, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation.

The invention claimed is:

1. A method, in a wireless device, for providing a carrier aggregation compatibility report comprising a subset of a total number of frequency bands and/or frequency band combinations supported by a wireless device, the wireless device being comprised in a communications network, the method comprising:

receiving, from a base station, parameters for selecting the subset;

selecting the subset based on the received parameters; and sending, to the base station, the selected subset in the carrier aggregation compatibility report, wherein the carrier aggregation compatibility report sent to the base station further comprises an indication that a number of frequency bands and/or frequency band combinations in the subset is less than the total number of frequency bands and/or frequency band combinations supported by the wireless device.

2. The method of claim 1, wherein the receiving further comprises receiving, from the base station, the parameters in a User Equipment, UE, Capability Enquiry message.

3. The method of claim 1, wherein the received parameters comprise at least one frequency band and/or at least one frequency band combination supported by the base station.

4. The method of claim 1, wherein the parameters are based on pre-configured rules.

5. The method of claim 1, wherein the carrier aggregation compatibility report further comprises the parameters for selecting the subset.

6. The method of claim 5, wherein the parameters are comprised in a UERadioAccessCapabilityInformation information element.

7. The method of claim 1, wherein the sending further comprises sending, to the base station, an additional subset of the total number of frequency bands and/or frequency band combinations supported by the wireless device.

8. The method of claim 1, further comprising receiving, from the base station, additional parameters for selecting an additional subset of the total number of frequency bands and/or frequency band combinations supported by the wireless device.

9. A wireless device for providing a carrier aggregation compatibility report comprising a subset of a total number of frequency bands and/or frequency band combinations supported by the wireless device, the wireless device being configured for operation in a communications network and comprising:
    a receiver configured to receive, from a base station, parameters for selecting the subset;
    processing circuitry configured to select the subset based on the received parameters; and
    a transmitter configured to send, to the base station, the selected subset in the carrier aggregation compatibility report;
    wherein the carrier aggregation compatibility report further comprises an indication that a number of frequency bands and/or frequency band combinations in the subset is less than the total number of frequency bands and/or frequency band combinations supported by the wireless device.

10. The wireless device of claim 9, wherein the receiver is further configured to receive, from the base station, the parameters in a User Equipment, UE, Capability Enquiry message.

11. The wireless device of claim 9, wherein the processing circuitry is configured to select the subset, where the parameters comprise at least one frequency band and/or at least one frequency band combination supported by the base station.

12. The wireless device of claim 9, wherein the processing circuitry is configured to select the subset, where the parameters are based on pre-configured rules.

13. The wireless device of claim 9, wherein the carrier aggregation compatibility report further comprises the parameters for selecting the subset.

14. The wireless device of claim 13, wherein the parameters are comprised in a UERadioAccessCapabilityInformation information element.

15. The wireless device of claim 9, wherein, via the transmitter, the processing circuitry is configured to send to the base station an additional subset of the total number of frequency bands and/or frequency band combinations supported by the wireless device.

16. The wireless device of claim 9, wherein, via the receiver, the processing circuitry is configured to receive, from the base station, additional parameters for selecting an additional subset of the total number of frequency bands and/or frequency band combinations supported by the wireless device.

17. A method, in a base station, for obtaining a carrier aggregation compatibility report comprising subset of a total number of frequency bands and/or frequency band combinations supported by a wireless device, said base station being comprised in a wireless communications network, the method comprising:
    determining parameters for selecting the subset;
    sending, to the wireless device, the parameters; and
    receiving, from the wireless device, the carrier aggregation compatibility report comprising the subset, wherein the carrier aggregation compatibility report further comprises an indication that a number of frequency bands and/or frequency band combinations in the subset is less than the total number of frequency bands and/or frequency band combinations supported by the wireless device.

18. The method of claim 17, wherein the determining further comprises determining the parameters to be at least one supported frequency band and/or at least one supported frequency band combination.

19. The method of claim 18, wherein the at least one supported frequency band and/or at least one supported frequency band combination is supported by a local network; based on geographical information of the wireless device, base station and/or neighbouring base stations; and/or are supported by an operator network.

20. The method of claim 17, wherein the determining further comprises determining the parameters based on pre-configured rules.

21. The method of claim 17, wherein the determining further comprises determining the parameters based on information previously provided by the wireless device.

22. The method of claim 17, wherein the sending further comprises sending, to the wireless device, the parameters in a User Equipment, UE, Capability Enquiry message.

23. The method of claim 17, wherein the carrier aggregation compatibility report further comprises the parameters utilized in selecting the subset.

24. The method of claim 23, wherein the parameters are comprised in a UERadioAccessCapabilityInformation information element.

25. The method of claim 17, wherein the receiving further comprises receiving, from the wireless device, an additional subset of the total number of frequency bands and/or frequency band combinations supported by the wireless device.

26. The method of claim 17, further comprising sending additional parameters to the wireless device, for selecting an additional subset of the total number of frequency bands and/or frequency band combinations supported by the wireless device.

27. The method of claim 17, wherein the base station is a source base station, the method further comprising sending the subset to a target base station, during a handover of the wireless device to the target base station.

28. The method of claim 17, further comprising sending the subset to a Mobility Management Entity, MME.

29. A base station configured to obtain a carrier aggregation compatibility report comprising subset of a total number of frequency bands and/or frequency band combinations supported by a wireless device, said base station being configured for operation in a wireless communications network and comprising:
   processing circuitry configured to determine parameters for selecting the subset;
   a transmitter configured to send the parameters to the wireless device; and
   a receiver configured to receive, from the wireless device, the carrier aggregation compatibility report comprising the subset;
   wherein the carrier aggregation compatibility report further comprises an indication that a number of frequency bands and/or frequency band combinations in the subset is less than the total number of frequency bands and/or frequency band combinations supported by the wireless device.

30. The base station of claim 29, wherein the processing circuitry is further configured to determine the parameters to be at least one supported frequency band and/or at least one supported frequency band combination.

31. The base station of claim 30, wherein the at least one supported frequency band and/or at least one supported frequency band combination is supported by a local network, based on geographical information of the wireless device, base station and/or neighbouring base stations, and/or are supported by an operator network.

32. The base station of claim 29, wherein the processing circuitry is further configured to determine the parameters based on pre-configured rules.

33. The base station of claim 29, wherein the processing circuitry is further configured to determine the parameters based on information previously provided by the wireless device.

34. The base station of claim 29, wherein, via the transmitter, the processing circuitry is configured to send the parameters to the wireless device in a User Equipment, UE, Capability Enquiry message.

35. The base station of claim 29, wherein the carrier aggregation compatibility report further comprises the parameters for selecting the subset.

36. The base station of claim 35, wherein the parameters are comprised in a UERadioAccessCapabilityInformation information element.

37. The base station of claim 29, wherein, via the receiver, the processing circuitry is further configured to receive, from the wireless device, an additional subset of the total number of frequency bands and/or frequency band combinations supported by the wireless device.

38. The base station of claim 29, wherein, via the transmitter, the processing circuitry is configured to send additional parameters to the wireless device, for selecting an additional subset of the total number of frequency bands and/or frequency band combinations supported by the wireless device.

39. The base station of claim 29, wherein the base station further comprises a network interface and, for operation as a source base station, the base station is configured to send the subset via the network interface to a target base station during a handover of the wireless device to the target base station.

40. The base station of claim 29, wherein the base station includes a network interface and is configured to send the subset to a Mobility Management Entity, MME, via the network interface.

* * * * *